United States Patent [19]

Leboeuf

[11] Patent Number: 4,935,272
[45] Date of Patent: Jun. 19, 1990

[54] DUAL-OVENABLE NYLON CONTAINER

[75] Inventor: Christian Leboeuf, Kingston, Canada

[73] Assignee: Du Pont Canada, Inc., Mississauga, Canada

[21] Appl. No.: 266,880

[22] Filed: Nov. 2, 1988

[30] Foreign Application Priority Data

Nov. 3, 1987 [GB] United Kingdom ............... 8725744

[51] Int. Cl.$^5$ .............................................. C08K 3/32
[52] U.S. Cl. ................................... 428/35.7; 524/417; 524/514
[58] Field of Search ................ 524/417, 514; 428/35.7

[56] References Cited

U.S. PATENT DOCUMENTS 3,228,898  1/1966  Illing et al. .......................... 524/417

FOREIGN PATENT DOCUMENTS 1022356  12/1977  Canada.
0229527  7/1987  European Pat. Off..

Primary Examiner—Lewis T. Jacobs

[57] ABSTRACT

The present invention provides a container made from an aliphatic polyamide, said polyamide containing at least 0.2 wt. % of an additive selected from ortho-phosphorous acid, hypophosphorous acid, alkali metal salts and alkaline earth metal salts thereof. The containers are particularly useful for packaging foods, e.g. frozen dinners. The additive in the container minimizes browning of the container from exposure to high temperatures experienced in conventional ovens.

18 Claims, No Drawings

DUAL-OVENABLE NYLON CONTAINER

The present invention relates to an ovenable container, e.g. a tray. Ovenable trays are used in the pre-packaged food industry. Usually food is placed on such trays, the trays are lidded and the lidded trays are placed in food refrigerators or freezers.

It is known to sell foods, e.g. meals, in lidded trays, to consumers with the intention that the food in the lidded trays may be heated or cooked in a conventional, convection oven or a microwave oven. Such trays are often known in the trade as dual-ovenable trays. Most commonly such dual-ovenable trays are made by thermoforming sheets of crystallizable polyethylene terephthalate. More recently, polyamides have been used. Canadian Patent No. 1 022 356 to Duffield et al., which issued 1977 December 13, discloses production of substantially inflexible containers from polyamides using continuous melt thermoforming techniques. European Patent Application No. 0 229 527 to D. L. Winthrop, which was published 1987 July 22, discloses injection moulding of blends of nylon and a compatible olefin-based polymer to form dual-ovenable containers.

It has been found that many nylon containers, when used to cook or reheat food in conventional or convection thermal energy ovens, tend to turn brown, thus making the containers commercially undesirable. The present invention seeks to overcome such a problem.

Accordingly the present invention provides an aliphatic polyamide container, said polyamide containing at least 0.2 wt. % of an additive selected from orthophosphorous acid, hypophosphorous acid, alkali metal and alkaline earth metal salts of said acids.

The preferred additive is sodium hypophosphite.

In one embodiment the container is made from a blend of the polyamide and a compatible olefin-based polymer.

In another embodiment the container is made from a partially crystalline polyamide and a compatibilized olefin-based polymer in an amount of from 1 to 30 wt. % of the total weight.

In a preferred embodiment the polyamide is made from an aliphatic dicarboxylic acid and an aliphatic diamine, each having from 6 to 24 carbon atoms. In another embodiment the polyamide is made from an aliphatic aminoacid having from 6 to 24 carbon atoms. Particularly preferred polyamides are nylon 66, nylon 6 and mixtures thereof. Nylon 6 having an intrinsic viscosity (IV) in the range of 0.75 to 1.3 dl/g is useful. It is preferred that the intrinsic viscosity be in the range of 0.95 to 1.2 dl/g, particularly 1.0 to 1.1 dl/g. Intrinsic viscosity is measured at 25° C. in formic acid (85 wt % acid to 15 wt. % water) by methods known in the art. An especially preferred polyamide is nylon 66 having a relative viscosity (RV) in the range of 25 to 250, particularly 40 to 85 and more particularly 45 to 60. Relative viscosity is the ratio of viscosity at 25° C. of an 8.4 wt. % solution of nylon in 90 wt. % formic acid (90 wt. % acid to 10 wt. % water) to the viscosity at 25° C. of the 90 wt. % formic acid alone. The polyamide may be a blend of polyamides, e.g. nylon 66 having a relative viscosity of 50 and nylon 66 having a relative viscosity of 200. The polyamide may also be a blend of different polyamides e.g. nylon 6 and nylon 66.

In another embodiment the polyamide contains a modifying material selected from the group consisting of fillers, pigments, dyes and mixtures thereof. The polyamide may also contain small quantities of antioxidants, thermal stabilizers, lubricants, release agents, flow modifiers and the like. The specific modifying material chosen will depend on the end-use requirements.

Olefin-based polymer modifying materials tend to make the containers flexible and tough, and more suitable for microwave applications. The compatibilized olefin-based polymers may be olefin-based polymers having polar groups attached thereto which allow the olefin-based polymer and the polyamide to be blended without phase separation. Such compatibilized olefin-based polymers may be in the form of so-called graft copolymers. The compatibilized olefin-based polymers may also be mixtures of compatibilized olefin-based polymers and olefin-based polymers which are not compatibilized. Examples of such incompatible polymers include homopolymers of ethylene or propylene, copolymers of ethylene and $C_4$ to $C_{10}$ alpha-olefins, polyisobutylene and poly(4-methylpentene-1). Examples of compatibilized olefin-based polymers include copolymers of ethylene and unsaturated carboxylic acid or ester monomers, e.g. ethylene/vinyl acetate copolymers, ethylene/methylacrylate copolymers, ethylene/ethylacrylate copolymers, ethylene/n-butylacrylate copolymers, ethylene/methacrylate copolymers, ethylene/methacrylic acid copolymers, and partially neutralized ethylene/methacrylic copolymers (ionomers), hydrocarbon alpha-olefins grafted with unsaturated carboxylic acids or unsaturated anhydrides, e.g. ethylene/acrylate ester copolymer grafted with unsaturated carboxylic acid or unsaturated anhydrides, ethylene/vinyl acetate copolymers grafted with unsaturated carboxylic acids or unsaturated anhydrides, ethylene/$C_4$ to $C_{10}$ alpha-olefin copolymers grafted with unsaturated carboxylic acids or unsaturated anhydrides, ethylene homopolymers grafted with unsaturated carboxylic acids or unsaturated anhydrides. The preferred unsaturated carboxylic acid is maleic acid and the preferred unsaturated anhydride is maleic anhydride.

Useful concentrations of such olefin-based polyolefin modifying materials fall within the range of 1–30 wt. % of the blend, with 10–20 wt. % being preferred. Many of the olefin-based polymer modifying materials may be added to improve the toughness of the containers, particularly at low temperatures, e.g. polyethylene grafted with maleic anhydride, or to improve impact resistance, e.g. ethylene/methacrylic acid copolymers. With incompatible olefin-based polymers, it is necessary to also add small quantities of a compatibilized olefin-based polymer. For example, small amounts of ionomer, e.g. up to about 5 wt. % of the blend, in order to assist in compatibilizing the polyolefin and the polyamide. For convenience, however, a graft copolymer as the sole compatibilized olefin-based polymer is preferred.

Ionomer modifying materials in the amount of 1–30 wt. % of the blend tend to make the containers flexible and tough, properties which are especially important at low temperatures. Zinc ionomers are preferred. However, at high temperatures, e.g. about 230° C., such containers tend to become less rigid and hence they tend to be more suitable for microwave cooking or lower temperature cooking in conventional ovens. Stiffness of such ionomer-modified containers may be improved by the addition of inorganic mineral or siliceous fillers, e.g. talc, glass bubbles, kaolin and mica.

Fillers may be used in containers which are either modified with olefin-based polymers or not. Suitable fillers include fibrous inorganic fillers, e.g. glass fibres,; fibrous organic fillers, e.g. aramid fibres; powdered fillers, e.g. kaolin, fused quartz, calcium carbonate; siliceous fillers, e.g. glass beads, hollow glass spheres; platy fillers, e.g. talc, mica. The platy fillers are much preferred because they substantially improve the heat distortion characteristic of the injection moulded containers. The platy fillers should preferably have a largest dimension (hereinafter referred to as "diameter") of less than about 150 μm and a minimum particle diameter to particle thickness ratio (otherwise referred to as the aspect ratio) of about 20:1. It is preferable that the aspect ratio be as large as practical, e.g. as large as 50:1 to 100:1. Wet ground mica is the preferred filler, having a mesh size between 200 and 325 U.S. sieve, particularly between 200 and 325 U.S. sieve. Suitable grades of mica are sold under the trade marks Alsibronze 12 and Huber WG-1. The fillers may be added in amounts of 1 to 40 wt. % of the blend, preferably in amounts of 10 to 30 wt. %.

In addition, pigments or dyes may be added for aesthetic effect. In particular, titanium dioxide may be added for opacity. Other pigments may be added for their colour appeal. Antioxidant, e.g. 1,3,5-trimethyl-2,4,6-tris(3,5-di-tertbutyl-4-hydroxybenzyl)benzene, heat stabilizers, e.g. copper salts, processing aids and the like may also be added as are known in the art.

The container preferably has a thickness in the range of 0.38 to 1.10 mm.

The container may have a peripheral shaped lip, the purpose of which is to provide a means for attaching a lid to the container and/or stiffen the container. Attachment of the lid may be by mechanical means, e.g. by crimping, or by other means, e.g. adhesive attachment. The peripheral shaped lip, if present, may be thicker than other parts of the container. The shape of the lip may be any one of known forms. The container may also be compartmentalized in order to separate different kinds of food, for example in a two-compartment tray, meat may be in one compartment and vegetables in another. The compartments may be formed in such a way that each compartment is, in itself, a container and adjacent compartments are joined only at the lip of the walls of the containers. The latter construction of the container is more expensive to produce because, in essence, there are two walls between adjacent compartments rather than one, as in the former construction.

The container is preferably tray shaped, i.e. with relatively shallow walls compared to the surface area of the floor of the container.

The container may be injection moulded by known methods. It will be appreciated by those skilled in the art that it is structurally advantageous for the floor and walls to be joined smoothly, with "curved corners". The container may also be thermoformed, e.g. continuously melt thermoformed.

The selection of thickness of the container depends in part upon the size of the container and in part upon the composition of the material from which the container is to be formed, e.g. injection moulded. Merely from a structural standpoint, it will be clear, that, for a given composition and container design, the thicker the container the stiffer and tougher will be the container. It will also be appreciated, however, that the thicker the container, the heavier and more costly to produce it will be.

The ortho-phosphoric acid, ortho-phosphorous acid, hypophosphorous acid or salt thereof may be added to molten polyamide, extruded into particulate form and then formed into the container, e.g. injection moulded, or may be physically blended with the polyamide just prior to forming the container, e.g. just prior to injection moulding. The concentration of ortho-phosphoric acid, ortho-phosphorous acid, hypophosphorous acid or salt thereof in the polyamide is preferably in the range of 0.2 to 1.5 wt. %, particularly from 0.5 to 1.5 wt. % and more particularly from 0.5 to 1.0 wt. %. It is preferred that the containers be injection moulded from previously melt-blended polyamide, sodium hypophosphite and modifying material. Some additives, including the ortho-phosphoric acid, ortho-phosphorous acid, hypophosphorous acid or salts thereof, may be added more conveniently in an injection moulding process, e.g. colourant The present invention may be illustrated by the following examples:

EXAMPLE I

A composition consisting of 71.2 wt. % nylon 6,6, 25.0 wt. % 325 mesh mica, 0.1 wt. % zinc stearate, 3.0 wt. % titanium dioxide and 0.7 wt. % sodium hypophosphite was melt-blended and extruded into pellet form. The pellets were then injection moulded, using a Battenfeld (trade mark) BK1300-1400, 165 tonne injection moulding machine, into circular trays. The trays were approximately 21 cm inner diameter in planform by 17 mm deep, having a wall and floor thickness of 1.01 mm, and having a peripheral lip about 14 mm wide and 1.01 mm thick. The trays were then filled with dinner portions and frozen. The frozen dinners, including trays, were heated in Kenmore (trade mark) conventional oven, Model 46040, preheated to 176° C., for 35 mins. to reconstitute the food for eating. Upon removal from the oven the trays were evaluated for discolouration associated with oxidative degradation of nylon at elevated temperatures. The colour of the trays was found to be substantially unchanged from that of a tray which had never undergone the cooking cycle.

EXAMPLE II

Samples of nylon 6,6 resin, having a relative viscosity of 52, were melt compounded with 1.0 wt % titanium dioxide and an additive selected from the group consisting of (a) 1.0 wt. % tris(2,4-di-tert-butylphenyl)phosphite, (b) 1.0 wt. % N,N'-hexamethylene bis(3,5-di-tert-butyl-4hydroxyhydrocinnamamide), (c) 1.0 wt. % 1,3,5-trimethyl-2,4,6-tris(3,5-di-tert-butyl-4-hydroxybenzyl)-benzene, (d) 0.06 wt. % copper stearate, (e) 1.0 wt. % sodium hypophosphite, and (f) 1.0 wt. % manganese hypophosphite. Further samples were prepared without any additives. Only sample (e) is useful in the present invention; the other samples are included for comparison purposes.

The samples were moulded into plaques of dimensions 14 cm by 10.8 cm by 0.762 mm. The plaques were then heated in a Kenmore Model 46040 conventional oven according to the following procedure:

Plaques were placed one at a time at the centre of the centre oven rack in the oven, preheated to 176° C. for 5, 10 and 15 mins, and at 204° C. for 5, 10 and 15 mins.

The samples without additives showed increasing browning with increasing time and temperature exposure, reaching a severe dark golden brown after 204° C. and 15 mins. Samples (a), (b), (c), (d) and (f) showed discolouration similar to that of the sample without additives. Sample (e), which is indicative of the performance of the trays of the present invention, showed virtually no change in colour, after exposure to 204° C. for 10 mins, compared to an unheated plaque. Even at 204° C. after 15 mins exposure, only a faint yellow tinge was apparent on the specimen. This shows the clear superiority of sodium hypophosphite, compared to commonly used nylon antioxidants and other hypophosphites, in the present invention.

EXAMPLE III

A composition consisting of 83.88 wt. % nylon 6,6, 13.0 wt. % 325 mesh mica, 0.2 wt. % zinc stearate, 2.5 wt. % titanium dioxide and 0.42 wt. % sodium hypophosphite was melt-blended and extruded into pellet form. The pellets were then injection moulded, using a Klockner-Windsor (trade mark) 200 tonne injection moulding machine, into octagonal trays. The diameter of a circle inscribing the planform of the octagon, of each tray, was approximately 20 cm by 18 mm deep, having a wall and floor thickness of 0.76 mm, and having a peripheral lip about 13 mm wide and 0.76 mm thick. The trays were then filled with dinner portions and frozen. The frozen dinners, including trays, were heated in Kenmore (trade mark) conventional oven, Model 46040, preheated to 176° C. for 35 mins. to reconstitute the food for eating. Upon removal from the oven the trays were evaluated for discolouration associated with oxidative degradation of nylon at elevated temperatures. The discolouration of the peripheral lips of the trays after the heating cycle was found to be substantially unchanged from that of trays which had never undergone the heating cycle. Similar trays which did not contain any sodium hypophosphite were substantially discoloured after the heating cycle.

I claim:

1. An injection moulded aliphatic polyamide container said polyamide containing at least 0.2 wt. % of an additive selected from ortho-phosphorous acid, hypophosphorous acid, alkali metal salts and alkaline earth metal salts thereof.

2. A container according to claim 1 wherein the additive is sodium hypophosphite, 3. A container according to claim 1 wherein the polyamide is a blend of a polyamide and a compatibilized olefin-based polymer.

4. A container according to claim 2 wherein the compatibilized olefin-based polymer is present in an amount of from 1 to 30 wt. % of the total weight.

5. A container according to claim 1 wherein the polyamide is made from an aliphatic dicarboxylic acid and an aliphatic diamine, each having from 6 to 24 carbon atoms.

6. A container according to claim 1 wherein the polyamide is made from an aliphatic aminoacid having from 6 to 24 carbon atoms.

7. A container according to claim 3 wherein the compatibilized olefin-based polymers is selected from ethylene/vinyl acetate copolymers, ethylene/methylacrylate copolymers, ethylene/ethylacrylate copolymers, ethylene/n-butylacrylate copolymers, ethylene/methacrylate copolymers, ethylene/methacrylic acid copolymers, and partially neutralized ethylene/methacrylic copolymers, ethylene/acrylate ester copolymer grafted with unsaturated carboxylic acid or unsaturated anhydrides, ethylene/vinyl acetate copolymers grafted with unsaturated carboxylic acids or unsaturated anhydrides, ethylene/$C_4$ to $C_{10}$ alpha-olefin copolymers grafted with unsaturated carboxylic acids or unsaturated anhydrides, ethylene homopolymers grafted with unsaturated carboxylic acids or unsaturated anhydrides.

8. A container according to claim 1 wherein the polyamide contains from 1 to 40 wt. % of a filler selected from the group consisting of inorganic fillers and fibrous organic fillers.

9. A container according to claim 8 wherein the filler is a platy filler.

10. A container according to claim 1 wherein the wall thickness is in the range of 0.38 to 0.90 mm.

11. A container according to claim 2 wherein the polyamide is a blend of a polyamide and a compatibilized olefin-based polymer.

12. A container according to claim 11 wherein the compatibilized olefin-based polymer is present in an amount of from 1 to 30 wt. % of the total Weight.

13. A container according to claim 2 wherein the polyamide is made from an aliphatic dicarboxylic acid and an aliphatic diamine, each having from 6 to 24 carbon atoms.

14. A container according to claim 2 wherein the polyamide is made from an aliphatic aminoacid having from 6 to 24 carbon atoms.

15. A container according to claim 11 wherein the compatibilized olefin-based polymers is selected from ethylene/vinyl acetate copolymers, ethylene/methylacrylate copolymers, ethylene/ethylacrylate copolymers, ethylene/n-butylacrylate copolymers, ethylene/methacrylate copolymers, ethylene/methacrylic acid copolymers, and partially neutralized ethylene/methacrylic copolymers, ethylene/acrylate ester copolymer grafted with unsaturated carboxylic acid or unsaturated anhydrides, ethylene/vinyl acetate copolymers grafted with unsaturated carboxylic acids or unsaturated anhydrides, ethylene/$C_4$ to $C_{10}$ alpha-olefin copolymers grafted with unsaturated carboxylic acids or unsaturated anhydrides, ethylene homopolymers grafted with unsaturated carboxylic acids or unsaturated anhydrides.

16. A container according to claim 2 wherein the polyamide contains from 1 to 40 wt. % of a filler selected from the group consisting of inorganic fillers and fibrous organic fillers.

17. A container according to claim 16 wherein the filler is a platy filler.

18. A container according to claim 2 wherein the wall thickness is in the range of 0.38 to 0.90 mm.

* * * * *